(12) United States Patent
Ji et al.

(10) Patent No.: US 12,651,008 B2
(45) Date of Patent: Jun. 9, 2026

(54) QUERY-BASED TABLE VISUALIZATION

(71) Applicant: Microsoft Technology Licensing, LLC, Redmond, WA (US)

(72) Inventors: Wei Ji, Beijing (CN); Yining Chen, Beijing (CN); Mengyu Zhou, Beijing (CN); Shi Han, Beijing (CN); Daxin Jiang, Beijing (CN); Dongmei Zhang, Beijing (CN); Elbio Renato Torres Abib, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/548,556

(22) PCT Filed: Apr. 7, 2022

(86) PCT No.: PCT/US2022/023755
§ 371 (c)(1),
(2) Date: Aug. 31, 2023

(87) PCT Pub. No.: WO2022/231811
PCT Pub. Date: Nov. 3, 2022

(65) Prior Publication Data
US 2024/0152531 A1      May 9, 2024

(30) Foreign Application Priority Data
Apr. 30, 2021   (CN) .......................... 202110478217.3

(51) Int. Cl.
| | | |
|---|---|---|
| *G06F 16/28* | (2019.01) | |
| *G06F 11/34* | (2006.01) | |
| *G06F 16/248* | (2019.01) | |

(52) U.S. Cl.
CPC ........ *G06F 16/287* (2019.01); *G06F 11/3452* (2013.01); *G06F 16/248* (2019.01)

(58) Field of Classification Search
None
See application file for complete search history.

(56) References Cited

U.S. PATENT DOCUMENTS

| | | |
|---|---|---|
| 2013/0325838 A1 | 12/2013 | Liao |
| 2016/0012052 A1* | 1/2016 | Zoryn ............... G06F 16/24578 707/728 |
| 2020/0341740 A1* | 10/2020 | Kota .......................... G06F 8/34 |
| 2021/0374332 A1* | 12/2021 | Viégas .................. G06F 16/248 |
| 2022/0121679 A1* | 4/2022 | Singh .................... G06F 40/216 |
| 2023/0385321 A1* | 11/2023 | Agrawal ............... G06T 11/206 |

OTHER PUBLICATIONS

Ji et al., "Identifying relationships using information extracted from documents", 2016 (Year: 2016).*

(Continued)

*Primary Examiner* — Dawaune A Conyers
(74) *Attorney, Agent, or Firm* — Schwegman Lundberg & Woessner, P.A.

(57) ABSTRACT

The present disclosure proposes method and apparatus for query-based table visualization. A query may be obtained. At least one search result for the query may be obtained. A table may be extracted from the at least one search result. At least one chart corresponding to the table may be generated based on the query and the table.

15 Claims, 7 Drawing Sheets

(56) References Cited

OTHER PUBLICATIONS

Bojanowski, et al., "Enriching Word Vectors with Subword Information", In Journal of Transactions of the Association for Computational Linguistics, vol. 5, Jun. 1, 2017, pp. 135-146.

Bowen, et al., "Open XML SDK", Retrieved From: https://github.com/dotnet/Open-XML-SDK, Apr. 6, 2023, 4 Pages.

Cho, et al., "Learning Phrase Representations using RNN Encoder-Decoder for Statistical Machine Translation", In Proceedings of the 2014 Conference on Empirical Methods in Natural Language Processing, Oct. 25, 2014, pp. 1724-1734.

Devlin, et al., "BERT: Pre-training of Deep Bidirectional Transformers for Language Understanding", In Repository of arXiv:1810.04805v2, May 24, 2019, 16 Pages.

Dibia, et al., "Data2Vis: Automatic Generation of Data Visualizations Using Sequence-to-Sequence Recurrent Neural Networks", In Journal of IEEE Computer Graphics and Applications, vol. 39, Issue 5, Jun. 24, 2019, pp. 33-46.

Ding, et al., "QuickInsights: Quick and Automatic Discovery of Insights from Multi-Dimensional Data", In Proceedings of the International Conference on Management of Data, Jun. 30, 2019, 15 Pages.

Dong, et al., "Semantic Structure Extraction for Spreadsheet Tables with a Multi-task Learning Architecture", In Proceedings of Workshop on Document Intelligence at NeurIPS, Nov. 2, 2019, 4 Pages.

Ehsan, et al., "Mu VE: Efficient Multi-Objective View Recommendation for Visual Data Exploration", In Proceedings of IEEE 32nd International Conference on Data Engineering, May 16, 2016, pp. 731-742.

Gu, et al., "Incorporating Copying Mechanism in Sequence-to-Sequence Learning", In Proceedings of the 54th Annual Meeting of the Association for Computational Linguistics, Aug. 7, 2016, pp. 1631-1640.

Hu, et al., "VizML: A Machine Learning Approach to Visualization Recommendation", In Proceedings of the CHI Conference on Human Factors in Computing Systems, May 4, 2019, 12 Pages.

Luo, et al., "DeepEye: Towards Automatic Data Visualization", In Proceedings of IEEE 34th International Conference on Data Engineering, Apr. 16, 2018, pp. 101-112.

Marcel, et al., "A Survey of Query Recommendation Techniques for Datawarehouse Exploration", In EDA, vol. RNTI-B-7, Jun. 2011, 16 Pages.

Milo, et al., "Next-Step Suggestions for Modern Interactive Data Analysis Platforms", In Proceedings of the 24th ACM SIGKDD International Conference on Knowledge Discovery & Data Mining, Aug. 19, 2018, pp. 576-585.

Moritz, et al., "Formalizing Visualization Design Knowledge as Constraints: Actionable and Extensible Models in Draco", In Journal of IEEE Transactions on Visualization and Computer Graphics, vol. 25, Issue 1, Aug. 20, 2018, pp. 438-448.

"International Search Report and Written Opinion Issued in PCT Application No. PCT/US22/023755", Mailed Date: Jul. 11, 2022, 9 Pages.

Ranzato, et al., "Sequence Level Training with Recurrent Neural Networks", In repository of arXiv:1511.06732v7, May 6, 2016, 16 Pages.

Satyanarayan, et al., "Vega-Lite: A Grammar of Interactive Graphics", In Journal of IEEE Transactions on Visualization and Computer Graphics, vol. 23, Issue 1, Jan. 2017, pp. 341-350.

Smilkov, et al., "Embedding Projector: Interactive Visualization and Interpretation of Embeddings", In repository of arXiv:1611.05469v1, Nov. 16, 2016, 4 Pages.

Tang, et al., "Extracting Top-K Insights from Multi-dimensional Data", In Proceedings of the ACM International Conference on Management of Data, May 14, 2017, 16 Pages.

Wilke, Clauso, "Fundamentals of Data Visualization: A Primer on Making Informative and Compelling Figures", Published by O'Reilly Media, Inc, Mar. 15, 2019, 389 Pages.

Williams, et al., "A Learning Algorithm for Continually Running Fully Recurrent Neural Networks", In Journal of Neural Computation, vol. 1, Issue 2, Jun. 1989, 10 Pages.

Wongsuphasawat, et al., "Voyager: Exploratory Analysis via Faceted Browsing of Visualization Recommendations", In Journal of IEEE Transactions on Visualization and Computer Graphics, Jan. 31, 2016, pp. 649-658.

Yu, et al., "TypeSQL: Knowledge-based Type-Aware Neural Text-to-SQL Generation", In repository of arXiv:1804.09769v1, Apr. 25, 2018, 7 Pages.

Zhang, et al., "A Survey on Multi-Task Learning", In repository of arXiv:1707.08114v2, Jul. 27, 2018, 20 Pages.

Zhou, et al., "Table2Analysis: Modeling and Recommendation of Common Analysis Patterns for Multi-Dimensional Data", In Proceedings of the AAAI Conference on Artificial Intelligence, Apr. 3, 2020, pp. 320-328.

Zhou, et al., "Table2Charts: Learning Shared Representations for Recommending Charts on Multi-dimensional Data", In Repository of arXiv:2008.11015v2, Jan. 8, 2021, 23 Pages.

Zhou, et al., "Table2Charts: Recommending Charts by Learning Shared Table Representations", In Proceedings of the 27th ACM SIGKDD Conference on Knowledge Discovery & Data Mining, Aug. 14, 2021, 11 Pages.

First Office Action Received for Chinese Application No. 202110478217.3, mailed on Aug. 9, 2025, 16 pages (English Translation Provided).

Second Office Action Received for Chinese Application No. 202110478217.3, mailed on Dec. 22, 2025, 18 pages (English Translation Provided).

Third Office Action Received for Chinese Application No. 202110478217.3, mailed on Mar. 9, 2026, 13 Pages.

* cited by examiner

100

Obtain a query
110

Obtain at least one search result for the query
120

Extract a table from the at least one search result
130

Generate at least one chart creating sequence corresponding to the table based on the query and the table
140

Create at least one chart based on the at least one chart creating sequence
150

200

| Major | Total Male Students | Total Female Students | Gender Ratio | Total Male Students Percentage | Total Female Students Percentage | Total Students | Total Major Students Percentage |
|---|---|---|---|---|---|---|---|
| Mathematics | 216 | 202 | 0.94 | 51.67% | 48.33% | 418 | 19.46% |
| Computer Science | 230 | 195 | 0.85 | 54.12% | 45.88% | 425 | 19.79% |
| Biological Sciences | 152 | 185 | 1.22 | 45.10% | 54.90% | 337 | 15.69% |
| Economics | 122 | 106 | 0.87 | 53.51% | 46.49% | 228 | 10.61% |
| History | 78 | 89 | 1.14 | 46.71% | 53.29% | 167 | 7.77% |
| Journalism | 82 | 95 | 1.16 | 46.33% | 53.67% | 177 | 8.24% |
| Music | 93 | 101 | 1.09 | 47.94% | 52.06% | 194 | 9.03% |
| Architecture | 110 | 92 | 0.84 | 54.46% | 45.54% | 202 | 9.40% |

300

400

500

900

| Obtain a query |
| 910 |

↓

| Obtain at least one search result for the query |
| 920 |

↓

| Extract a table from the at least one search result |
| 930 |

↓

| Generate at least one chart corresponding to the table based on the query and the table |
| 940 |

Query Obtaining Module
1010

Search Result Obtaining Module
1020

Table Extracting Module
1030

Chart Generating Module
1040

1000

Processor
1110

Memory
1120

1100

QUERY-BASED TABLE VISUALIZATION

PRIORITY CLAIM TO RELATED APPLICATIONS

This application is a U.S. national stage filing under 35 U.S.C. § 371 from International Application No. PCT/US2022/023755, filed on Apr. 7, 2022, and published as WO 2022/231811 on Nov. 3, 2022, which claims the benefit under 35 U.S.C. 119 to Chinese Application No. 202110478217.3, filed on Apr. 30, 2021, the benefit of priority of each of which is claimed herein, and which applications and publication are hereby incorporated herein by reference in their entirety.

BACKGROUND

With the development of computer technologies and network technologies, people obtain desired information more and more frequently through the network. Applications such as search engines can help users to easily obtain information on the network. For example, a user may enter a query in a search box of a search engine. The search engine may retrieve, based on the query, documents relevant to the query from a pre-built index database, then perform subsequent processing on the documents, such as relevance filtering, sorting, etc., and finally present a top-ranked series of documents to the user through a search results page.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for query-based table visualization. A query may be obtained. At least one search result for the query may be obtained. A table may be extracted from the at least one search result. At least one chart corresponding to the table may be generated based on the query and the table.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
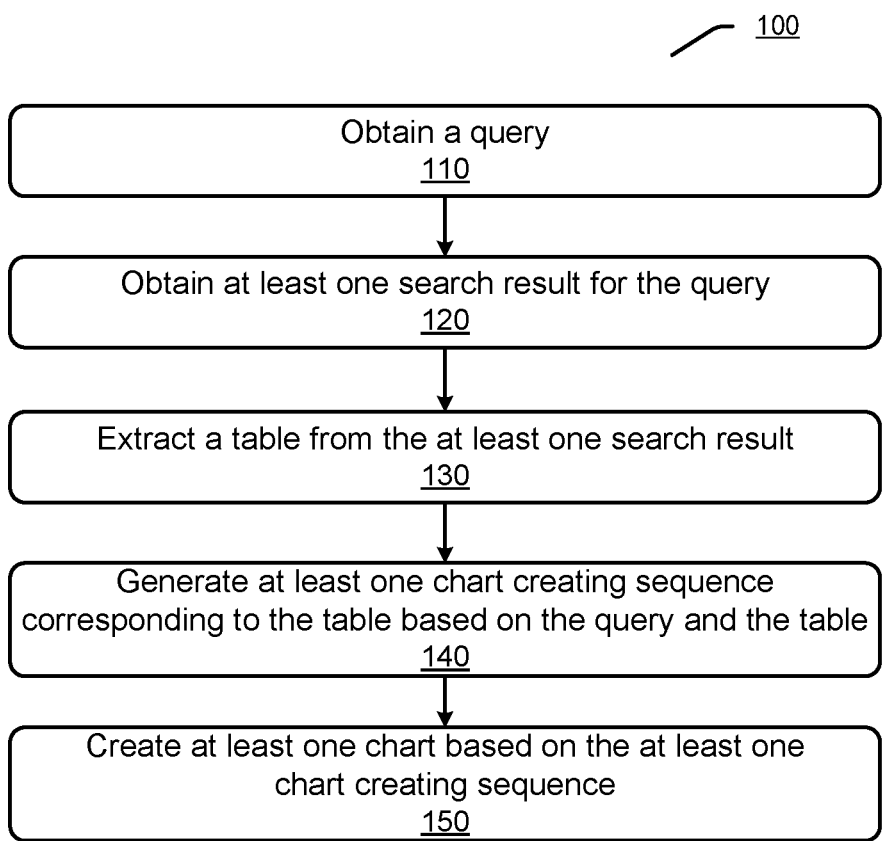
FIG. 1 illustrates an exemplary process for query-based table visualization according to an embodiment of the present disclosure.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

A search result page associated with a search engine may generally include related information of various documents. Users can quickly understand a specific document through viewing information of the document and decide whether to click on a corresponding link to obtain a deeper understanding. The information presented on the search result page may include titles, summaries, pictures, links, etc. In addition, in the case where a document includes a table, the table may also be presented on the search result page. Currently, the table presented on the search result page is usually extracted directly from the document, which may include complicated numbers that are not easy to read and understand.

Embodiments of the present disclosure propose a method for query-based table visualization. For example, a query and at least one search result for the query may be obtained, a table may be extracted from the at least one search result, and at least one chart corresponding to the table may be generated based on the query and the table. Herein, a query may refer to a text fragment provided by a user or other entity to a search engine to initiate a search for specific information, which may also be referred to as a search query. In addition, a document retrieved by a search engine and provided to a user may be referred to as a search result. A chart generated based on a table extracted from a specific search result may be presented in a search result page along with other information of the search result. Through visualizing the table as the chart, number associations and trends in the table can be displayed straightforwardly to the user. Therefore, presenting the chart on the search result page can provide the user with richer insights and help the user to understand content of the table.

In an aspect, the embodiments of the present disclosure propose to take a query from a user into consideration when generating a chart corresponding to a table. For example, the query may indicate information that the user desires to obtain. Taking the query into consideration when generating the chart can enable the generated chart to include data in the table corresponding to the information that the user desires to obtain, so as to provide the user with a chart of interest.

In another aspect, the embodiments of the present disclosure propose to generate a chart creating sequence corresponding to a table, and create a chart based on the chart creating sequence. Herein, a chart creating sequence may refer to an action sequence used to create a chart, which may include a series of actions following a predetermined template grammar, such as which data to select from a table, how to visualize the selected data, etc. The chart creating sequence may be generated through a number of approaches. For example, a query representation of a query and a table representation of the table may be generated separately, and the chart creating sequence may be generated based on the query representation and the table representation. Alternatively, a table representation of the table may be generated based on a query and a table, the table representation incorporating information of the query. Then, the chart creating sequence may be generated based on the table representation.

In yet another aspect, the embodiments of the present disclosure propose to perform table understanding operations on a table extracted from a search result. The table may consist of multiple rows and multiple columns. Herein, a column in a table may be referred to as a table field, or a field for short. Table understanding may include normalizing the table, such as converting numbers expressed in quantity units to pure numbers, unifying data formats, etc. The table understanding may also include determining a field type of each table field. For example, the field type of the table field may be determined based on information of cells in the table field through predefined rules. The above table understanding operations can help to obtain a more accurate table representation, thereby generating a more accurate chart creating sequence.

In still another aspect, the embodiments of the present disclosure propose to determine whether a query contains an intent about visualization when visualizing a table, and generate a chart corresponding to the table only when the query contains the intent about visualization. For example, when the query is "How to install Office", the query does not contain the intent about visualization. In this case, even if a table is extracted from search results for the query, the visualization process will not be performed on the table. Furthermore, the embodiments of the present disclosure propose to determine whether a table is relevant to a query when visualizing the table, and generate a chart corresponding to the table only when the table is relevant to the query. A table extracted from a search result may not be relevant to a query. Performing the chart generation operation only when the table is relevant to the query can save computing resources, thereby achieving more efficient table visualization. Whether the table is relevant to the query may be determined through a number of approaches. In an implementation, after the table is extracted from the search result, whether the table is relevant to the query may be determined through a classifier such as a Support Vector Machine (SVM), a deep learning model, etc. In another implementation, during generation of a chart creating sequence, whether a table is relevant to a query may be determined based on a query representation and a table representation separated from each other, or whether a table is relevant to a query may be determined based on a table representation incorporating information of the query. In yet another implementation, after the chart creating sequence is generated, whether the table is relevant to the query may be determined based on whether an action value corresponding to the chart creating sequence is higher than a predetermined threshold.

FIG. 1 illustrates an exemplary process 100 for query-based table visualization according to an embodiment of the present disclosure. In the process 100, a query and search results for the query may be obtained, a table may be extracted from the search results, and a chart corresponding to the table may be generated based on the query and the table.

At 110, a query may be obtained. For example, the query may be obtained from a search engine that provides a search service to users. The query may be received from a user by the search engine. As an example, the query could be "total male students and total female students of each major".

At 120, at least one search result for the query may be obtained. For example, the at least one search result for the query may be obtained from a search engine. The search result may be obtained by a search engine through performing operations such as searching for the query, sorting, etc.

At 130, a table may be extracted from the at least one obtained search result. The search result may be a web document in a Hypertext Markup Language (HTML) format. The table may be extracted from the search result through known table extraction techniques. Preferably, the table may be extracted from one or more top-ranked search results among the at least one obtained search result. Search results with higher rankings may be more relevant to the query, and therefore may be more interesting to users. Therefore, the table extraction operation may be performed only on the one or more top-ranked search results among the search results. For example, the table may be extracted from only the top 10 search results.

Figures 2, 3:
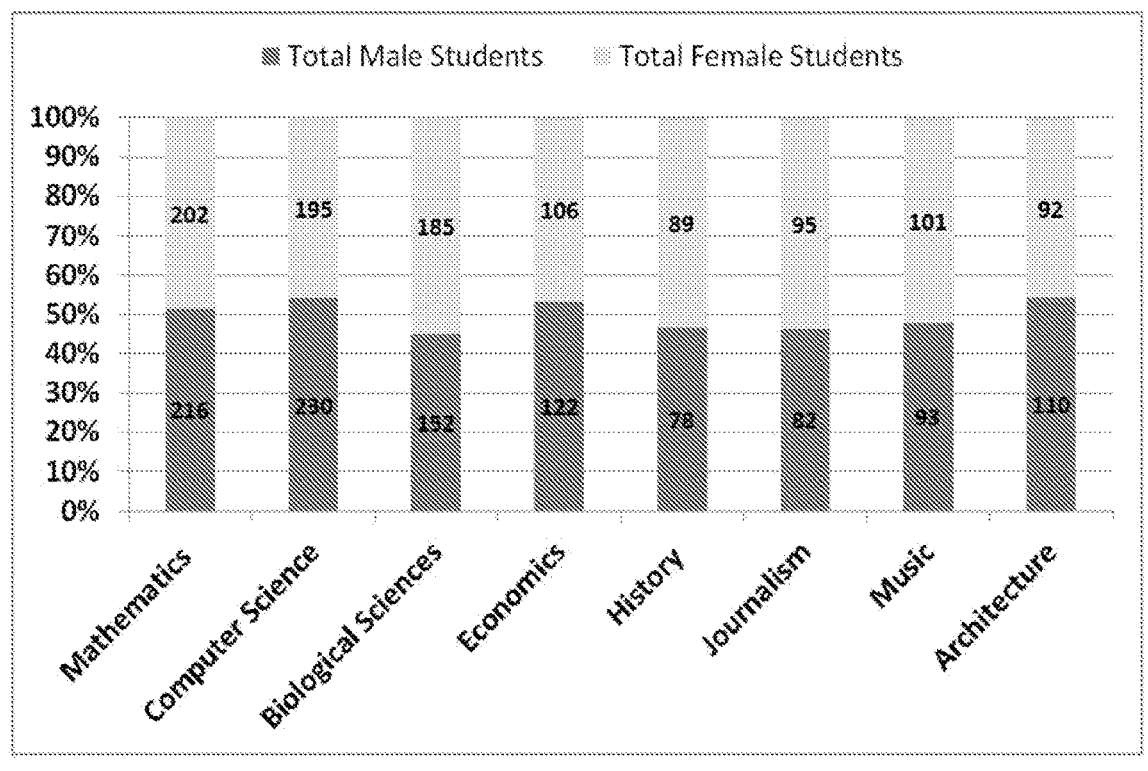
FIG. 2 illustrates an exemplary table extracted from a search result according to an embodiment of the present disclosure.
FIG. 3 illustrates an exemplary chart corresponding to the table in FIG. 2 according to an embodiment of the present disclosure.

FIG. 2 illustrates an exemplary table 200 extracted from a search result according to an embodiment of the present disclosure. The table 200 may be a table about student statistical information, and may be composed of 8 rows and 8 columns. Cells in the first row of the table may be referred to as headers. For example, headers of the table 200 may include cells "Major", "Total Male Students", "Total Female Students", "Gender Ratio", "Total Male Students Percentage", "Total Female Students Percentage", "Total Students" and "Total Major Students Percentage" in the first row. A row outside the first row of the table may be referred to as a body row. For example, body rows of the table 200 may include the second row to the eighth row in the table 200. All body rows may form a body of the table. The table may be divided into multiple fields. For example, the table may be divided into multiple fields based on columns. For example, the table 200 may include 8 fields divided according to 8 columns. The header of each field may be the cell located in the first row of the field. For example, the header of the first field of the table 200 is "Major". It should be appreciated that, according to actual application requirements, the table may also be divided in other ways.

At 140, at least one chart creating sequence corresponding to the table may be generated based on the query and the table. The chart creating sequence may include a series of actions for creating a chart. Each action may be represented by a corresponding token. As an example, a chart creating sequence generated based on the query "total male students and total female students of each major" and the table 200 in FIG. 2 may be "[Bar] (Total Male Students) (Total Female Students) [SEP] (Major) [Stack]", wherein the token "[Bar]" indicates the chart type, i.e., "bar chart", the tokens "(Total Male Students)" and "(Total Female Students)" indicate the names of the fields selected to be presented in the chart, the token "[SEP]" is a separator, the token "(Major)" is the name of another field selected to be presented in the chart, and the token "[Stack]" indicates a grouping operation, i.e., "stacking". The chart creating sequence may be generated through one of various processes for generating a chart creating sequence according to the embodiments of the present disclosure. Hereinafter, exemplary processes for generating a chart creating sequence according to the embodiments of the present disclosure will be described in conjunction with FIG. 4, FIG. 7 and FIG. 8.

At 150, at least one chart may be created based on the at least one chart creating sequence. The chart creating sequence may include a series of actions for creating a chart. The chart may be created based on the series of actions included in the chart creating sequence. FIG. 3 illustrates an exemplary chart 300 corresponding to the table 200 in FIG. 2 according to an embodiment of the present disclosure. The chart 300 may be created based on the above-mentioned chart creating sequence "[Bar] (Total Male Students) (Total Female Students) [SEP] (Major) [Stack]". In the chart 300, the horizontal direction shows the names of various majors, the vertical direction shows the total number of male students (Total Male Students) and the total number of female students (Total Female Students) of the corresponding major, and the total number of female students is stacked on top of the total number of male students. It can be seen that the information presented by the chart 300 generated according to the embodiment of the present disclosure matches the query "total male students and total female students of each major". Preferably, when there are multiple chart creating sequences, the multiple chart creating sequences may be ranked based on a predetermined criterion, and the chart may be created only based on the top-ranked chart creating sequence.

Through the process 100, the chart corresponding to the table may be generated based on the query and the table extracted from the search results for the query. Preferably, in the process 100, it may be determined whether the query contains an intent about visualization, and the chart corresponding to the table is generated only when the query contains the intent about visualization. Whether the query contains an intent about visualization may be determined through a classifier such as SVM, a deep learning model, etc. For example, when a query is "How to install Office", the query does not contain an intent about visualization. In this case, even if a table is extracted from search results for the query, the visualization process will not be performed on the table. In addition, in the process 100, it may be determined whether the table is relevant to the query, and the chart corresponding to the table is generated only when the table is relevant to the query, and the chart corresponding to the table is not generated when the table is not relevant to the query. Whether the table is relevant to the query may be determined through a number of approaches. In an implementation, after the table extraction operation at 130 is performed, it may be determined whether the table is relevant to the query. For example, whether the table is relevant to the query may be determined through a classifier such as SVM, a deep learning model, etc. The chart creating sequence generation step at 140 is performed only when the table is relevant to the query, and the chart creating sequence generation step at 140 is not performed when the table is not relevant to the query. In another implementation, during generation of a chart creating sequence, whether the table is relevant to the query may be determined based on a query representation and a table representation separated from each other, or whether the table is relevant to the query may be determined based on a table representation incorporating information of the query. The chart creating sequence corresponding to the table is generated only when the table is relevant to the query, and the chart creating sequence corresponding to the table is not generated when the table is not relevant to the query. In yet another implementation, after the chart creating sequence is generated, whether the table is relevant to the query may be determined based on whether an action value corresponding to the chart creating sequence is higher than a predetermined threshold. The chart is created based on the chart creating sequence only when the table is relevant to the query, and the chart is not created based on the chart creating sequence when the table is not relevant to the query. The exemplary processes of the latter two embodiments will be described later in conjunction with FIG. 4, FIG. 7 and FIG. 8.

It should be appreciated that although the foregoing discussion and the following discussion may involve examples of generating charts corresponding to English tables, the embodiments of the present disclosure are not limited to this, but may generate tables corresponding to chart in other languages in a similar manner. In addition, it should be appreciated that the process 100 in FIG. 1 is only an example of the process for query-based table visualization. According to actual application requirements, the process for query-based table visualization may comprise any other steps, and may comprise more or fewer steps.

Figure 4:
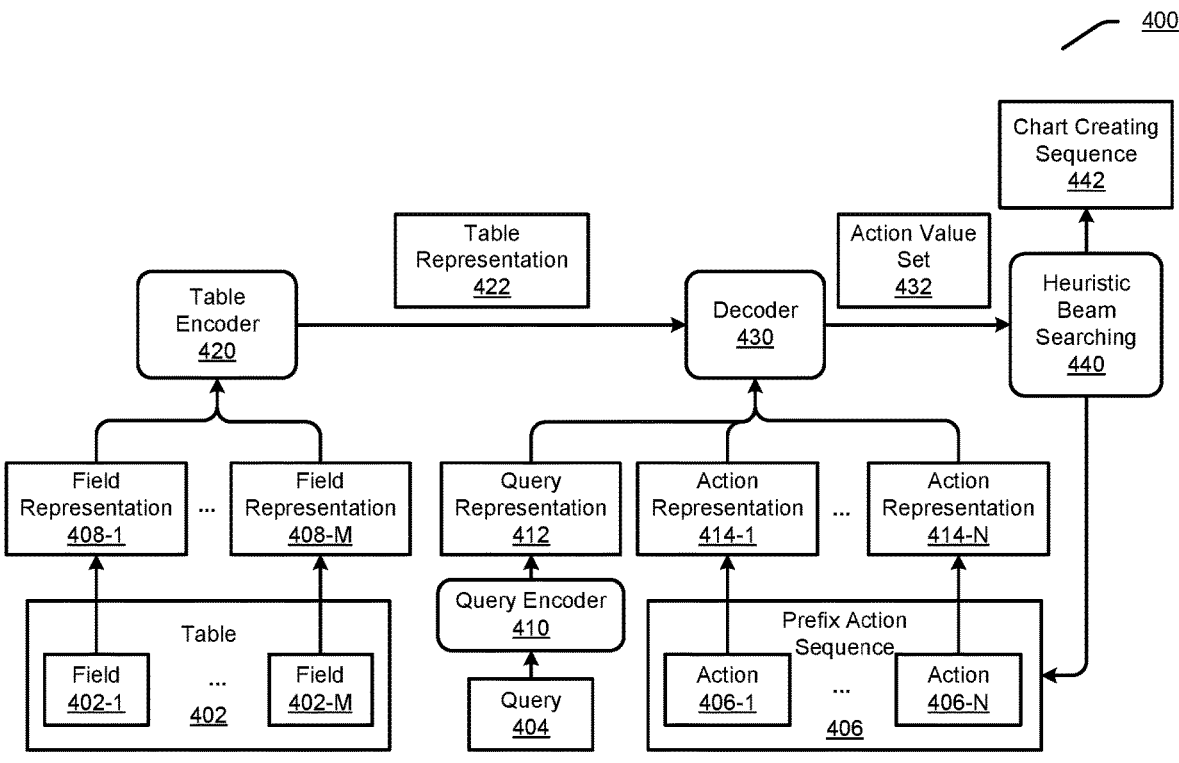
FIG. 4 illustrates an exemplary process for generating a chart creating sequence according to an embodiment of the present disclosure.

FIG. 4 illustrates an exemplary process 400 for generating a chart creating sequence according to an embodiment of the present disclosure. In the process 400, at least one chart creating sequence 442 corresponding to a table 402 may be generated based on the table 402 and a query 404. For example, a table representation 422 of the table 402 and a query representation 412 of the query 404 may be generated, and the at least one chart creating sequence 442 may be generated based on the table representation 422 and the query representation 412. The chart creating sequence 442 may be generated iteratively. For example, the next action may be determined based on the table representation 422, the query representation 412, and an action representation 414-1 to an action representation 414-N of the action 406-1 to the action 406-N in a prefix action sequence 406, and the determined next action may be appended to the prefix action sequence 406, wherein N≥1 is the number of actions included in the prefix action sequence 406. The action 406-1 to the action 406-N may be actions that have been determined. The above operations may be performed iteratively until at least one chart creating sequence 442 containing a complete action sequence is generated.

Figure 5:
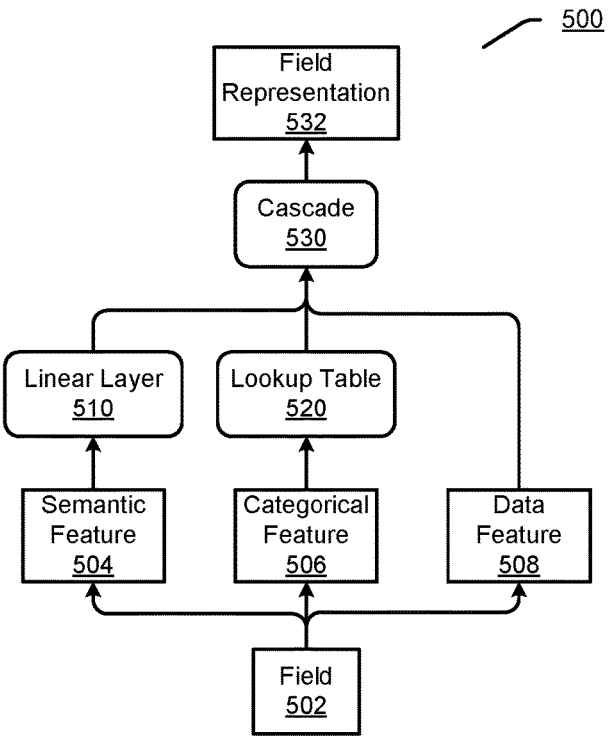
FIG. 5 illustrates an exemplary process for generating a field representation of a table field required to create a chart according to an embodiment of the present disclosure.

The table 402 may include multiple table fields, such as a field 402-1 to a field 402-M, wherein M≥1 is the number of fields. A field representation 408-1 to a field representation 408-M corresponding to the field 402-1 to the field 402-M may be generated. For example, a field representation 408-$m$ ($m \in [1,M]$) of a field 402-$m$ may be generated based on one or more of a semantic feature, a categorical feature, and a data feature of the field 402-$m$. FIG. 5 illustrates an exemplary process 500 for generating a field representation of table field required to create a chart according to an embodiment of the present disclosure. The field 502 may correspond to any one of the field 402-1 to the field 402-M in FIG. 4. A field representation 532 of the field 502 may be generated based on one or more of a semantic feature 504, a categorical feature 506, and a data feature 508 of the field 502.

The semantic feature 504 may refer to a feature related to semantic information of the field 502. The semantic feature 504 may be obtained from a pretrained natural language processing (NLP) model such as a FastText model, a Bidirectional Encoder Representations from Transformers (BERT) model, etc. In an implementation, the pretrained NLP model may generate the semantic feature 504 of the field 502 based on a header of the field 502. For example, when the field 502 is the first column in the table 200 of FIG. 2, the pretrained NLP model may generate the semantic feature 504 based on the header "Major" of the column. In the case where the header includes multiple words, the semantic feature 504 may be obtained through performing an average operation on the semantic features of the multiple words.

The categorical feature 506 may include features related to categorical information of the field 502, such as a token type indicating a type of a token, a segment type indicating which segment a token belongs to, a field type indicating a type of a field, a field role indicating whether a field is located in a counter header area of a table, a grouping operation, etc. The categorical feature 506 may be determined based at least on information of cells in the field 502 through predefined rules. For example, through a table understanding operation according to an embodiment of the present disclosure, the field type may be determined based on the information of the cells in the field 502 through predefined rules. An exemplary process of determining the field type will be described later in conjunction with FIG. 6.

The data feature 508 may include features related to data statistical information of the field 502, such as a feature indicating a numerical range of the field 502, a feature indicating the number of rows included in the field 502, and a feature indicating a ratio of integer values included in the field 502, etc. The data feature 508 may be acquired through known data feature acquisition techniques. The data feature 508 may be directed to a field in the table where statistical information may be calculated. For fields in the table that cannot be calculated for statistical information, their data features may be predefined or set to a null value. For example, for the table 200 in FIG. 2, the data feature 508 may be for the second to eighth columns in the table 200; and for the first column, since it contains text information for which statistical information cannot be calculated, its data feature may predefined or set to a null value.

The semantic feature 504 may be provided to a linear layer 510, to obtain a further representation of the semantic feature 504. The categorical feature 506 may be provided to a lookup table 520, to obtain a further representation of the categorical feature 506. A cascading unit 530 may cascade the further representation of the semantic feature 504, the further representation of the categorical feature 506, and the data feature 508 into a field representation 532.

Referring back to FIG. 4, the field representation 408-1 to the field representation 408-M may be provided to a table encoder 420. The table encoder 420 may be a known sequence encoder, such as an attention-mechanism-based transformer model, a bidirectional Gated Recurrent Unit (GRU) model, etc. The table encoder 420 may generate the table representation 422 of the table 402 based on the field representation 408-1 to the field representation 408-M. As described above, each field representation may be generated based on one or more of a semantic feature associated with a header, categorical feature, and data feature of the field.

Correspondingly, the table representation 422 may be generated based on a header set, categorical feature set, and data feature set of the table 402. A categorical feature of each of the multiple fields of the table 402 may be determined, to obtain multiple categorical features respectively corresponding to the multiple fields, and the multiple categorical features may be combined into the categorical feature set of the table 402. Similarly, a data feature of each of the multiple fields of the table 402 may be determined, to obtain multiple data features corresponding to the multiple fields, and the multiple data features may be combined into the data feature set of the table 402.

The query representation 412 of the query 404 may be generated through a query encoder 410. The query encoder 410 may be a pretrained natural language processing model such as a FastText model, a BERT model, etc. The query 404 may include one or more words. In the case where the query 404 includes multiple words, the query representation 412 may be obtained through performing an averaging operation on representations of the multiple words.

The action representation 414-1 to the action representation 414-N corresponding to the action 406-1 to the action 406-N may be generated through a process similar to the process 500 in FIG. 5. For example, one or more of a semantic feature, a categorical feature, and a data feature of each action may be obtained, and an action representation of the action may be generated based on the one or more of the semantic feature, the categorical feature, and the data feature. In particular, when an action is a field reference action, such as "(Total Male Students)" and "(Total Male Students)" and "(Major)" in the sequence "[Bar] (Total Male Students) (Total Female Students) [SEP] (Major) [Stack]", the semantic feature, the categorical feature, and the data feature of the action may be consistent with the semantic feature, the categorical feature, and the data feature of the field that the action refers to. When an action is a command action, such as "[Bar]", "[SEP]" and "[Stack]" in the above sequence, the semantic feature, the categorical feature, and the data feature of the action may be predefined or set to a null value.

The decoder 430 may be a known sequence generator, such as a unidirectional GRU model. The decoder 430 may calculate an action value set 432 of all actions of a valid action space corresponding to the prefix action sequence 406 based on the table representation 422 of the table 402, the query representation 412 of the query 404, and the action representation 414-1 to the action representation 414-N of the prefix action sequence 406. The above calculation may be performed using a known action value calculation method. The prefix action sequence may have a corresponding template grammar. The valid action space for the prefix action sequence may be defined. For example, a valid action space for a specific prefix action sequence may be defined as an action space that includes actions that follow a template grammar of the prefix action sequence.

The action value set 432 may be provided to a heuristic beam searching unit 440. The heuristic beam searching unit 440 may use a known heuristic beam searching technique to generate at least one chart creating sequence 442. For example, the heuristic beam searching unit 440 may determine at least one next action based on the action value set 432, and append the at least one determined next action to the prefix action sequence 406, respectively, to obtain at least one updated prefix action sequence. The above operations may be performed iteratively until at least one chart creating sequence 442 containing a complete action sequence is generated. The at least one generated chart creating sequence 442 may be for multiple chart types. The chart types may include, e.g., a bar chart, an area chart, a scatter chart, a pie chart, a line chart, a radar chart, etc. The first action in the prefix action sequence 406 or the chart creating sequence 442 may be a command action indicating the chart type. The first action may be determined by the heuristic beam searching unit 440, or may be pre-specified based on the type of chart that is expected to be generated.

It should be appreciated that although the foregoing discussion and the following discussion may involve examples where there is a single prefix action sequence, e.g., only the prefix action sequence 406 is shown in FIG. 4, the embodiments of the present disclosure are not limited thereto. According to actual application requirements, there may be multiple prefix action sequences at the same time, and an action value set may be calculated for each prefix action sequence and a chart creating sequence may be generated accordingly. In addition, it should be appreciated that although the foregoing discussion and the following discussion may involve examples where there is a single decoder, e.g., only the decoder 430 is shown in FIG. 4, the embodiments of the present disclosure are not limited thereto. For example, when there are multiple decoders for multiple chart types, the multiple decoders may be connected to the table encoder in parallel to generate chart creating sequences for multiple chart types.

Figure 6:
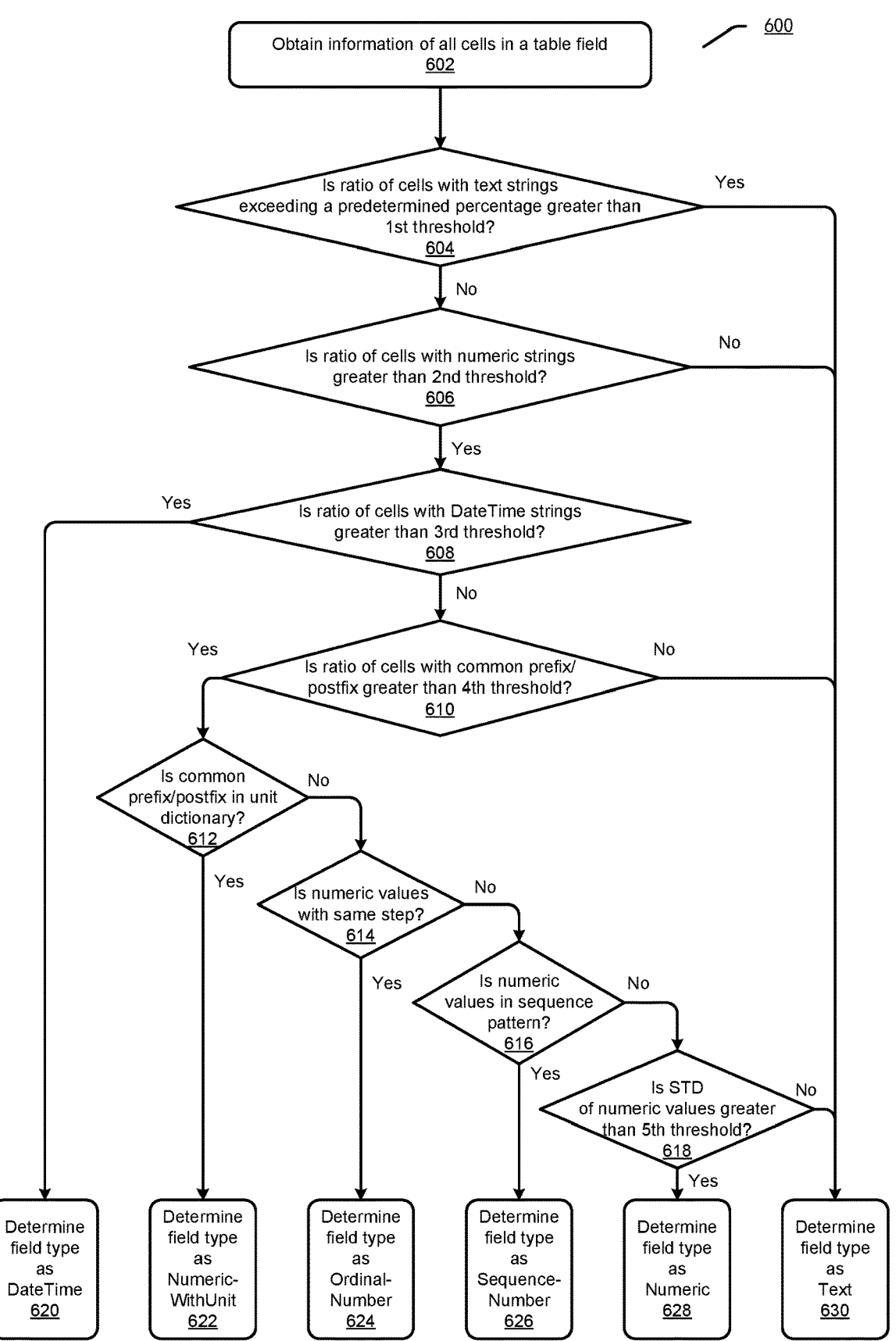
FIG. 6 illustrates an exemplary process for determining a field type of a table field according to an embodiment of the present disclosure.

In order to obtain a more accurate table representation to generate a more accurate chart creating sequence, an embodiment of the present disclosure proposes to perform a table understanding operation on a table. Table understanding may comprise performing a normalization operation on a table, such as converting numbers expressed in units of quantities to pure numbers, unifying data formats, etc. Table understanding may also comprise determining a field type of each table field. FIG. 6 illustrates an exemplary process 600 for determining a field type of a table field according to an embodiment of the present disclosure. The field type may include, e.g., DateTime describing date and time information, SequenceNumber describing sequence information, OrdinalNumber describing ordinal number information, NumericWithUnit describing numbers that contains units, Numeric describing numbers that do not contain units, and Text describing text information. A field type of a field may be determined through predefined rules based at least on information of cells in the field.

At 602, information of all cells in a table field may be obtained. Information of each cell may include, e.g., an entity type of the cell. The entity type may include, e.g., number, date and time, percentage, etc. The entity type of the cell may be identified through a known entity type recognition technology.

At 604, it may be determined whether a ratio of cells with text strings exceeding a predetermined percentage is greater than a first threshold. When the ratio is greater than the first threshold, the process may proceed to 630. At 630, the field type of the table field may be determined as "Text". When the ratio is less than or equal to the first threshold, the process may proceed to 606.

At 606, it may be determined whether a ratio of cells with numeric strings is greater than a second threshold. When the ratio is less than or equal to the second threshold, the process may proceed to 630. At 630, the field type of the table field may be determined as "Text". When the ratio is greater than the second threshold, the process may proceed to 608.

At 608, it may be determined whether a ratio of cells with DateTime strings is greater than a third threshold. When the ratio is greater than the third threshold, the process may proceed to 620. At 620, the field type of the table field may be determined as "DateTime". When the ratio is less than or equal to the third threshold, the process may proceed to 610.

At 610, it may be determined whether a ratio of cells with a common prefix/suffix is greater than a fourth threshold. When the ratio is less than or equal to the fourth threshold, the process may proceed to 630. At 630, the field type of the table field may be determined as "Text". When the ratio is greater than the fourth threshold, the process may proceed to 612.

At 612, it may be determined whether the common prefix/suffix of the cells is in a predefined unit dictionary. When the common prefix/suffix is in the predefined unit dictionary, the process may proceed to 622. At 622, the field type of the table field may be determined as "NumericWithUnit". When the common prefix/suffix is not in the predefined unit dictionary, the process may proceed to 614.

At 614, it may be determined whether numeric values in the cells have the same step. When the numeric values in the cells have the same step, the process may proceed to 624. At 624, the field type of the table field may be determined as "OrdinalNumber". When the numeric values in the cells do not have the same step, the process may proceed to 616.

At 616, it may be determined whether the numeric values in the cells are in the same sequence pattern. When the numeric values in the cells are in the same sequence pattern, the process may proceed to 626. At 626, the field type of the table field may be determined as "SequenceNumber". When the numeric values in the cells are not in the same sequence pattern, the process may proceed to 618.

At 618, it may be determined whether a standard deviation (STD) of the numeric values in the cells is greater than a fifth threshold. When the standard deviation is greater than the fifth threshold, the process may proceed to 628. At 628, the field type of the table field may be determined as "Numeric". When the standard deviation is less than or equal to the fifth threshold, the process may proceed to 630. At 630, the field type of the table field may be determined as "Text".

It should be appreciated that the process 600 in FIG. 6 is only an example of the process for determining the field type. According to actual application requirements, the process for determining the field type may comprise any other steps, and may comprise more or fewer steps. For example, the foregoing rules for determining the field type are only exemplary, and other rules may also be used to determine the field type. In addition, through the process 600, some additional information about the table may also be obtained, such as the unit and type of the number in the table field. The additional information may provide assistance when generating the chart, e.g., the additional information is added to a corresponding axis in the chart to make the content of the chart richer and more accurate. In addition, the specific order or hierarchy of the steps in the process 600 is only exemplary, and the process for determining the field type may be performed in an order different from the described order.

Figure 7:
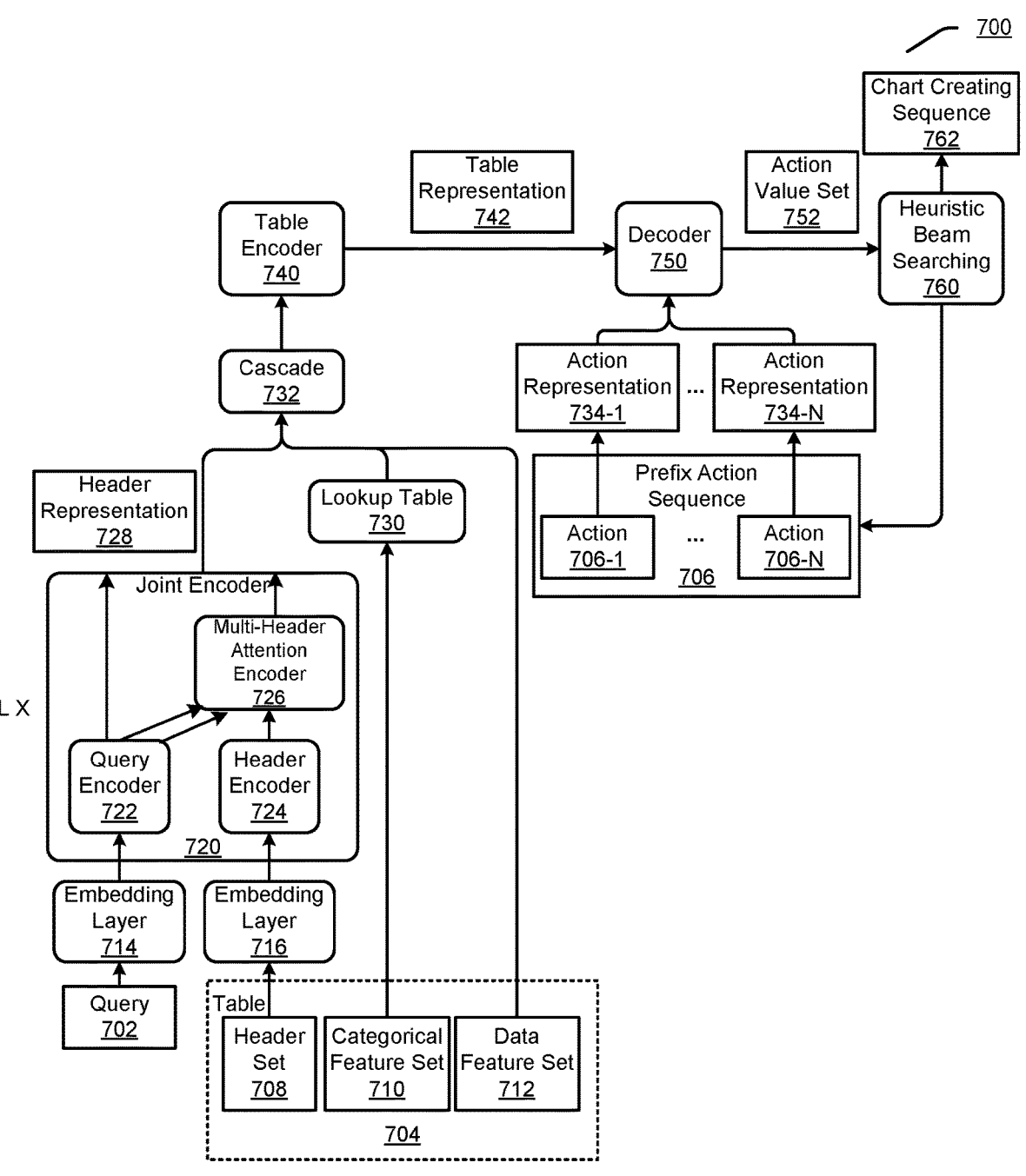
FIG. 7 illustrates another exemplary process for generating a chart creating sequence according to an embodiment of the present disclosure.

FIG. 7 illustrates another exemplary process 700 for generating a chart creating sequence according to an embodiment of the present disclosure. In the process 700, at least one chart creating sequence 762 corresponding to a table 704 may be generated based on a query 702 and the table 704. For example, a table representation 742 of the table 704 may be generated based on the query 702 and the table 704, and the at least one chart creating sequence 762 may be generated based at least on the table representation 742. The chart creating sequence 762 may be generated iteratively. For example, the next action may be determined based on the table representation 742 and an action representation 734-1 to an action representation 734-N of an action 706-1 to action 706-N in the prefix action sequence 706, and the determined next action may be appended to the prefix action sequence 706. The above operations may be performed iteratively until the at least one chart creating sequence 762 containing a complete action sequence is generated.

The table representation 742 may be generated based on the query 702, and a header set 708, a categorical feature set 710, and a data feature set 712 of the table 704.

The query 702 may be provided to an embedding layer 714. For example, a word sequence corresponding to the query 702 may be provided to the embedding layer 714. The word sequence corresponding to the query 702 may include a separator token "[SEP]" and one or more words in the query 702. The embedding layer 714 may generate an initial representation of the query 702.

The header set 708 may be provided to an embedding layer 716. For example, a word sequence corresponding to the header set 708 may be provided to the embedding layer 716. The word sequence corresponding to the header set 708 may include a plurality of word sequences corresponding to a plurality of headers in the header set 708, wherein a word sequence corresponding to each header may include a separator token "[SEP]" and one or more words in the header. The embedding layer 716 may generate an initial representation of the header set 708.

Subsequently, a header representation 728 of the table 704 may be generated based on the initial representation of the query 702 and the initial representation of the header set 708 through a set of joint encoders. The set of joint encoders may include, e.g., L (L≥1) joint encoders 720 having the same structure.

A query encoder 722 in the joint encoder 720 may be a deep neural network model, which may further encode the initial representation of the query 702, to generate an intermediate representation of the query 702. Similarly, a header encoder 724 may be a deep neural network model, which may further encode the initial representation of the header set 708, to generate an intermediate representation of the header set 708. The intermediate representation of the query 702 and the intermediate representation of the header set 708 may be provided to an attention-mechanism-based multi-header attention encoder 726, wherein the intermediate representation of the query 702 may be used as two inputs in three inputs of the multi-header attention encoder 726. The multi-header attention encoder 726 may generate a current representation of the header set 708 based on the intermediate representation of the query 702 and the intermediate representation of the header set 708. Through the operation of the joint encoder 720, it is possible to know which headers and/or which words in the header set 708 are relevant to words in the query 702, and this information may be included in the current representation of the header set 708. It should be appreciated that the query encoder 722 and the header encoder 724 may be optional, that is, the joint encoder 720 may not include the query encoder 722 and the header encoder 724. In the case that the joint encoder 720 does not include the query encoder 722 and the header encoder 724, the initial representation of the query 702 output by the embedding layer 714 and the initial representation of the header set 708 output by the embedding layer 716 may be directly provided to multi-header attention encoder 726. Accordingly, the multi-header attention encoder 726 may generate the current representation of the header set 708 based on the initial representation of the query 702 and the initial representation of the header set 708. The above operations may be performed iteratively L times through the L joint encoders 720, to obtain the header representation 728 of the header set 708.

The categorical feature set 710 and the data feature set 712 of the table 704 may be composed of categorical features and data features of various fields of the table 704, respectively. The categorical feature set 710 may be provided to a lookup table 730, to obtain a further representation of the categorical feature set 710. The cascading unit 732 may cascade the header representation 728, the further representation of the categorical feature set 710, and the data feature set, to obtain a cascaded representation. When cascading, information of the same field may be integrated. The cascaded representation may be provided to a table encoder 740. The table encoder 740 may be a known sequence encoder, such as an attention-mechanism-based transformer model, a bidirectional GRU model, etc. The table encoder 740 may further encode the cascaded representation to generate the table representation 742 of the table 704.

The action representation 734-1 to the action representation 734-N corresponding to the action 706-1 to the action 706-N may be generated through a process similar to the process 500 in FIG. 5.

A processing of a decoder 750 may be similar to the processing of the decoder 430 in FIG. 4. For example, the decoder 750 may calculate an action value set 752 for all actions in a valid action space corresponding to the prefix action sequence 706 based on the table representation 742 and the action representation 734-1 to the action representation 734-N.

The action value set 752 may be provided to a heuristic beam searching unit 760. A processing of the heuristic beam searching unit 760 may be similar to the processing of the heuristic beam searching unit 440 in FIG. 4. For example, the heuristic beam searching unit 760 may determine at least one next action based on the action value set 752, and append the at least one determined next action to the prefix action sequence 706, respectively, to obtain at least one updated prefix action sequence. The above operations may be performed iteratively until at least one chart creating sequence 762 containing a complete action sequence is generated.

In the process 700, the set of joint encoders 720 including an attention-mechanism-based multi-header attention encoder 726 is used to generate the header representation 728 corresponding to the header set 708 in the table 704. The header representation 728 may include information about which headers and/or which words in the header set 708 are relevant to words in the query 702. The header representation 728 may be further used to generate the table representation 742. Such a table representation 742 can help the decoder 750 and the heuristic beam searching unit 760 to generate a chart creating sequence that more closely matches the query 702.

Figure 8:
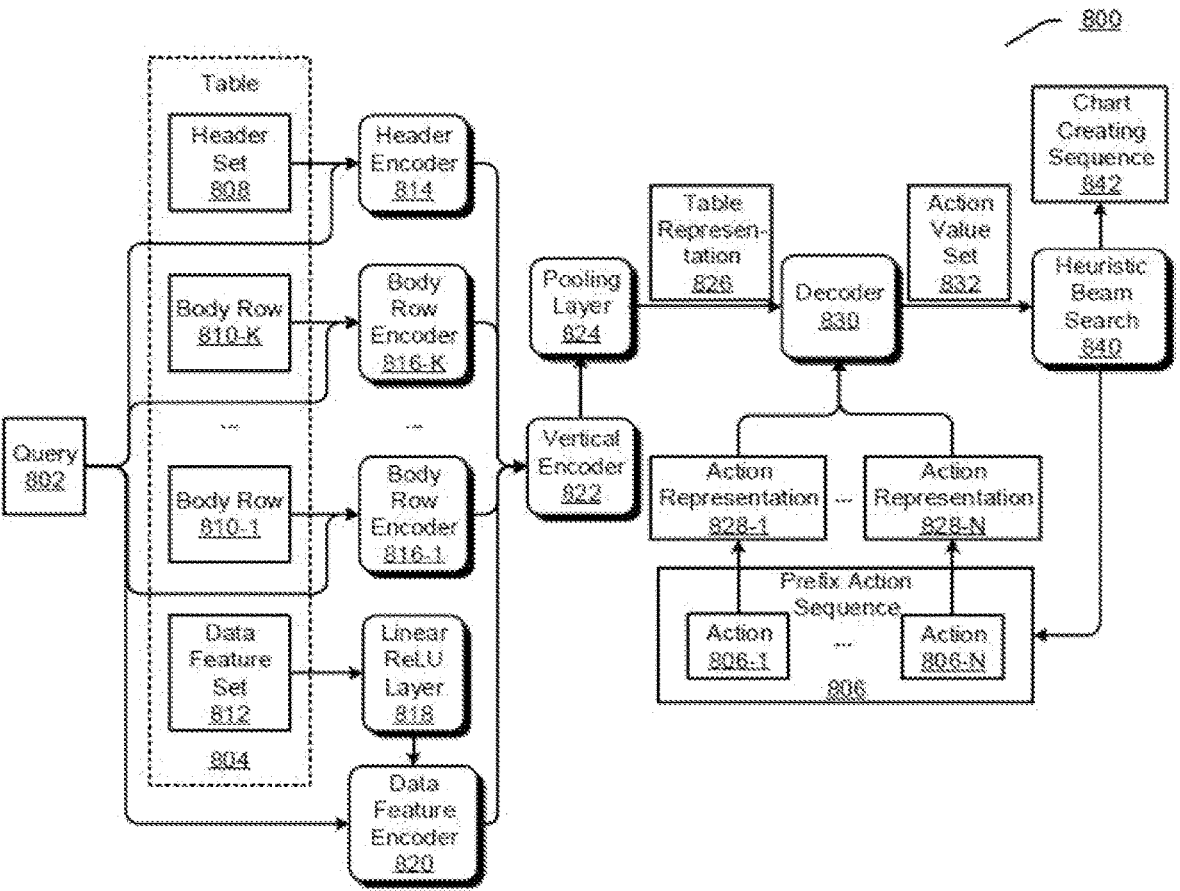
FIG. 8 illustrates yet another exemplary process for generating a chart creating sequence according to an embodiment of the present disclosure.

FIG. 8 illustrates yet another exemplary process 800 for generating a chart creating sequence according to an embodiment of the present disclosure. In the process 800, at least one chart creating sequence 842 corresponding to a table 804 may be generated based on a query 802 and the table 804. For example, a table representation 826 of the table 804 may be generated based on the query 802 and the table 804, and the at least one chart creating sequence 842 may be generated based at least on the table representation 826. The chart creating sequence 842 may be generated iteratively. For example, the next action may be determined based on the table representation 826 and an action representation 828-1 to an action representation 828-N of an action 806-1 to an action 806-N in a prefix action sequence 806, and the determined next action may be appended to the prefix action sequence 806. The action 806-1 to the action 806-N may be actions that have been determined. The above operations may be performed iteratively until the chart creating sequence 842 containing a complete action sequence is generated.

The table representation 826 is generated based on the query 802, and a header set 808, a body row set, and a data feature set 812 of the table 804. The body row set may include a body row 810-1 to a body row 810-K, wherein K≥1 is the number of body rows included in the body row set 810. The body row set may be formed through sampling a predetermined number of rows from a body of the table 804. The predetermined number may be determined based on the number of columns of the table 804. For example, when the number of columns in the table 804 is small, a larger predetermined number may be set; and when the number of columns in the table 804 is larger, a smaller predetermined number may be set. The predetermined number of rows may be sampled from the body of the table 804 through a number of approaches. In an implementation, a column may be selected, and rows including the most frequently occurring value in the column are used as the sampled rows. In another implementation, a column may be selected, and rows including the maximum value or the minimum value in the column may be used as the sampled rows.

A header representation of the table 804 may be generated based on the query 802 and the header set 808 through a header encoder 814. For example, a word sequence corresponding to the query 802 and a word sequence corresponding to the header set 808 may be spliced into a single word sequence, and the single word sequence may be provided to the header encoder 814. The word sequence corresponding to the query 802 may include a separator token "[SEP]" and one or more words in the query 802. The word sequence corresponding to the header set 808 may include a plurality of word sequences corresponding to a plurality of headers in the header set 808, wherein a word sequence corresponding to each header may include a separator token "[SEP]" and one or more words in the header. The header encoder 814 may be, e.g., an attention-mechanism-based transformer model, which may generate a header representation of the table 804.

A body representation of the table 804 may be generated based on the query 802 and the body row set 810 through a body row encoder set. The body row encoder set may include a body row encoder 816-1 to a body row encoder 816-K. The body row encoder 816-$k$ ($k\in[1,K]$) may generate a representation of a body row 810-$k$ based on the query 802 and the body row 810-$k$. For example, a word sequence corresponding to the query 802 and a word sequence corresponding to the body row 810-$k$ may be spliced into a single word sequence, and the single word sequence may be provided to the body row encoder 816-$k$. The word sequence corresponding to the query 802 may include a separator token "[SEP]" and one or more words in the query 802. The word sequence corresponding to the body row 810-$k$ may include a plurality of word sequences corresponding to a plurality of cells in the body row 810-$k$, and a word sequence corresponding to each cell may include a separator token "[SEP]" and one or more words in the cell. The body row encoder 816-$k$ may be, e.g., an attention-mechanism-based transformer model, which may generate a representation of the body row 810-$k$. A plurality of representations corresponding to the body row 810-1 to the body row 810-K may be combined into a body representation of the table 804.

A data feature representation of the table 804 may be generated based on the query 802 and a data feature set 812 through a data feature encoder 820. The data feature set 812 may be processed through a Rectified Linear Unit (ReLU) 818, and provided to a data feature encoder 820 together with the query 802. A word sequence corresponding to the query 802 and the processed data feature set may be spliced into a single sequence, and the single sequence may be provided to the data feature encoder 820. The data feature encoder 820 may be, e.g., an attention-mechanism-based transformer model, which may generate the data feature representation of the data feature set 812.

The header representation, the body representation, and the data feature representation all include information of the query 802. The table representation 826 of the table 804 may be generated based on the header representation, the body representation, and the data feature representation of the table 804. For example, the header representation, the body representation, and the data feature representation of the table 804 may be provided to a vertical encoder 822. The vertical encoder 822 may integrate information of the same field to obtain multiple intermediate field representations corresponding to multiple fields, and then respectively encode the multiple intermediate field representations to obtain multiple field representations corresponding to the multiple fields. Each field representation may include a representation corresponding to a header of a field, a representation corresponding to a body row set of the field, and a representation corresponding to a data feature of the field. These multiple field representations may be provided to a pooling layer 824. The pooling layer 824 may perform a pooling operation on the multiple field representations, to obtain multiple representation vectors respectively corresponding to the multiple fields. These multiple representation vectors may be used as the table representation 826 of the table 804.

An action representation 828-1 to an action representation 828-N corresponding to an action 806-1 to an action 806-N may be generated through a process similar to the process 500 in FIG. 5.

The table representation 826 may be provided to a decoder 830. A processing of the decoder 830 may be similar to the processing of the decoder 430 in FIG. 4. For example, the decoder 830 may calculate an action value set 832 for all actions in a valid action space corresponding to the prefix action sequence 806 based on the table representation 826 and the action representation 828-1 to the action representation 828-N.

The action value set 832 may be provided to a heuristic beam searching unit 840. A processing of the heuristic beam searching unit 840 may be similar to the processing of the heuristic beam searching unit 440 in FIG. 4. For example, the heuristic beam searching unit 840 may determine at least one next action based on the action value set 832, and append the at least one determined next action to the prefix action sequence 806, respectively, to obtain at least one updated prefix action sequence. The above operations may be performed iteratively until the at least one chart creating sequence 842 containing a complete action sequence is generated.

In the process 800, the header representation, the body representation, and the data feature representation of the table 804 are generated through the attention-mechanism-based header encoder 814, the body row encoder set, and the data feature encoder 820, respectively. These representations may include information about which headers and/or words in the header set, which body rows and/or words in the body row set, or which data features in the data feature set are relevant to words in the query 802. These representations may be further used to generate the table representation 826. Such a table representation 826 may help the decoder 830 and the heuristic beam searching unit 840 to generate a chart creating sequence that more closely matches the query 802.

According to the embodiments of the present disclosure, during generation of a chart creating sequence, whether a table is relevant to a query may be determined based on a query representation and a table representation separated from each other, or whether a table is relevant to a query may be determined based on a table representation incorporating information of the query. The chart creating sequence corresponding to the table is generated only when the table is relevant to the query, and the chart creating sequence corresponding to the table is not generated when the table is not relevant to the query. As an example, in the process 400, after the query representation 412 and the table representation 422 are obtained, whether the table 402 is relevant to the query 404 may be determined based on the query representation 412 and the table representation 422. In an implementation, the query representation 412 and the table representation 422 may be provided to a classifier such as a deep learning model. The classifier may determine whether the table 402 is relevant to the query 404 based on the query representation 412 and the table representation 422. The query representation 412 and the table representation 422 are provided to the decoder 430 only when the table 402 is relevant to the query 404, and the subsequent chart creating sequence generation process is performed accordingly. As another example, in the process 700, after the table representation 742 incorporating the information of the query 702 is obtained, whether the table 704 is relevant to the query 702 may be determined based on the table representation 742. In an implementation, the table representation 742 may be provided to a classifier such as a deep learning model. The classifier may determine whether the table 704 is relevant to the query 702 based on the table representation 742. The table representation 742 is provided to the decoder 750 only when the table 704 is relevant to the query 702, and the subsequent chart creating sequence generation process is performed accordingly.

According to the embodiments of the present disclosure, after a chart creating sequence is generated, whether a table is relevant to a query may be determined based on whether an action value corresponding to the chart creating sequence is higher than a predetermined threshold. In an implementation, an action value of the last action in the chart creating sequence may be regarded as the action value corresponding to the chart creating sequence. A chart is created based on the chart creating sequence only when the table is relevant to the query, and the chart is not created based on the chart creating sequence when the table is not relevant to the query. For example, in the process 800, after the chart creating sequence 842 is generated, whether the table 804 is relevant to the query 802 may be determined based on whether an action value corresponding to the chart creating sequence 842 is higher than a predetermined threshold. When the action value is higher than the predetermined threshold, it may be determined that the table 804 is relevant to the query 802, and a chart corresponding to the table 804 may be created based on the chart creating sequence 842; and when the action value is lower than or equal to the predetermined threshold, it may be determined that the table 804 is not relevant to the query 802, the chart corresponding to the table 804 is not created based on the chart creating sequence 842.

It should be appreciated that the above criteria for determining whether a table is relevant to a query are only exemplary. According to actual application requirements, other criteria may also be used to determine whether a table is relevant to a query.

Figure 9:
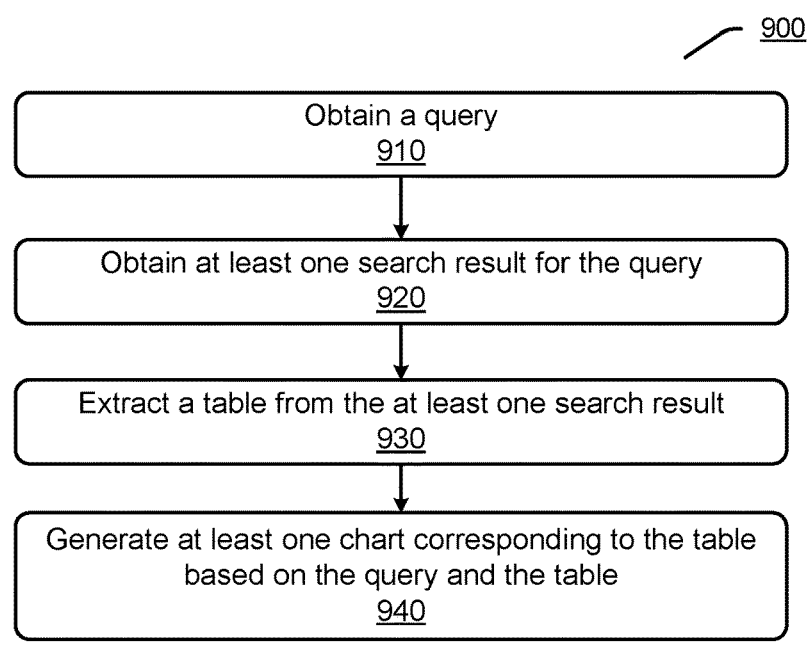
FIG. 9 is a flowchart of an exemplary method for query-based table visualization according to an embodiment of the present disclosure.

FIG. 9 is a flowchart of an exemplary method 900 for query-based table visualization according to an embodiment of the present disclosure.

At 910, a query may be obtained.

At 920, at least one search result for the query may be obtained.

At 930, a table may be extracted from the at least one search result.

At 940, at least one chart corresponding to the table may be generated based on the query and the table.

In an implementation, the extracting a table may comprise: extracting the table from one or more top-ranked search results among the at least one search result.

In an implementation, the method 900 may further comprise: determining whether the table is relevant to the query. The generating at least one chart may comprise: in response to determining that the table is relevant to the query, generating the at least one chart based on the query and the table.

In an implementation, the generating at least one chart may comprise: generating at least one chart creating sequence corresponding to the table based on the query and the table; and creating the at least one chart based on the at least one chart creating sequence.

The method 900 may further comprise: determining whether an action value corresponding to the at least one chart creating sequence is higher than a predetermined threshold. The creating the at least one chart may comprise: in response to determining that the action value is higher than the predetermined threshold, creating the at least one chart based on the at least one chart creating sequence.

The generating at least one chart creating sequence may comprise: generating a query representation of the query; generating a table representation of the table; and generating the at least one chart creating sequence based on the query representation and the table representation.

The method 900 may further comprise: determining whether the table is relevant to the query based on the query representation and the table representation. The generating the at least one chart creating sequence may comprise: in response to determining that the table is relevant to the query, generating the at least one chart creating sequence based on the query representation and the table representation.

The generating a table representation may comprise: generating the table representation based on a header set, a categorical feature set, and a data feature set of the table.

The generating at least one chart creating sequence may comprise: generating a table representation of the table based on the query and the table; and generating the at least one chart creating sequence based on the table representation.

The method 900 may further comprise: determining whether the table is relevant to the query based on the table representation. The generating the at least one chart creating sequence may comprise: in response to determining that the table is relevant to the query, generating the at least one chart creating sequence based on the table representation.

The generating a table representation may comprise: generating the table representation based on the query, and a header set, a categorical feature set, and a data feature set of the table.

The generating the table representation may comprise: generating a header representation of the table based on the query and the header set; and generating the table representation based at least on the header representation.

The method 900 may further comprise: determining a categorical feature of each field of multiple fields of the table, to obtain multiple categorical features respectively corresponding to the multiple fields; and combining the multiple categorical features into the categorical feature set.

The determining a categorical feature of each field may comprise: determining the categorical feature through predefined rules based at least on information of cells in the field.

The generating a table representation may comprise: generating the table representation based on the query, and a header set, a body row set, and a data feature set of the table.

The generating the table representation may comprise: generating a header representation of the table based on the query and the header set; generating a body representation of the table based on the query and the body row set; generating a data feature representation of the table based on the query and the data feature set; and generating the table representation based on the header representation, the body representation, and the data feature representation.

The method 900 may further comprise: sampling a predetermined number of rows from a body of the table to form the body row set.

It should be appreciated that the method 900 may further comprise any steps/processes for query-based table visualization according to the embodiments of the present disclosure as mentioned above.

Figure 10:
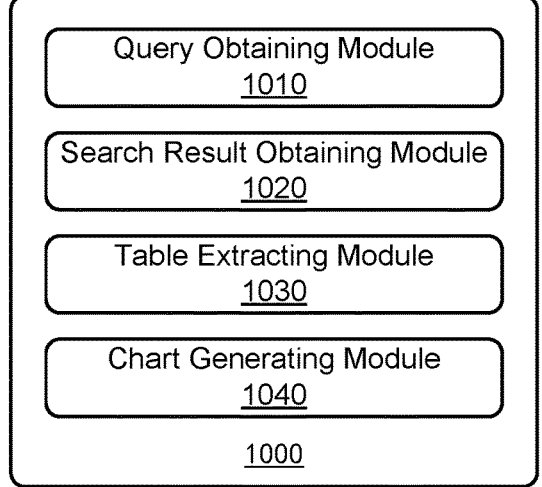
FIG. 10 illustrates an exemplary apparatus for query-based table visualization according to an embodiment of the present disclosure.

FIG. 10 illustrates an exemplary apparatus 1000 for query-based table visualization according to an embodiment of the present disclosure.

The apparatus 1000 may comprise: a query obtaining module 1010, for obtaining a query; a search result obtaining module 1020, for obtaining at least one search result for the query; a table extracting module 1030, for extracting a table from the at least one search result; and a chart generating module 1040, for generating at least one chart corresponding to the table based on the query and the table. Furthermore, the apparatus 1000 may further comprise any other modules configured for query-based table visualization according to the embodiments of the present disclosure as mentioned above.

Figure 11:
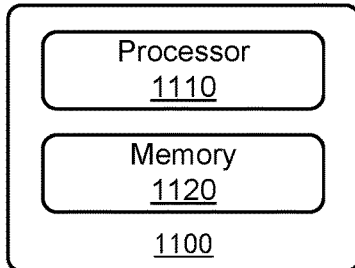
FIG. 11 illustrates an exemplary apparatus for query-based table visualization according to an embodiment of the present disclosure.

FIG. 11 illustrates an exemplary apparatus 1100 for query-based table visualization according to an embodiment of the present disclosure.

The apparatus 1100 may comprise at least one processor 1110; and a memory 1120 storing computer-executable instructions. The computer-executable instructions, when executed, may cause the at least one processor 1110 to: obtain a query, obtain at least one search result for the query, extract a table from the at least one search result, and generate at least one chart corresponding to the table based on the query and the table.

In an implementation, the generating at least one chart may comprise: generating at least one chart creating sequence corresponding to the table based on the query and the table; and creating the at least one chart based on the at least one chart creating sequence.

It should be appreciated that the processor 1100 may further perform any steps/processes for query-based table visualization according to the embodiments of the present disclosure as mentioned above.

The embodiments of the present disclosure propose a computer program product for query-based table visualization, comprising a computer program that is executed by at least one processor for: obtaining a query; obtaining at least one search result for the query; extracting a table from the at least one search result; and generating at least one chart corresponding to the table based on the query and the table. Furthermore, the computer program may further executed for implementing any steps/processes for query-based table visualization according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for query-based table visualization according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts. In addition, the articles "a" and "an" as used in this specification and the appended claims should generally be construed to mean "one" or "one or more" unless specified otherwise or clear from the context to be directed to a singular form.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for query-based table visualization, the method comprising:

obtaining a query submitted to a search engine;

obtaining at least one search result for the query from the search engine, wherein the search result is dynamically generated by the search engine in response to the query and is presented on a search results page;

retrieving a web document associated with the at least one search result presented on the search results page and extracting a table from the retrieved web document using table extraction techniques;

generating a table summary including a plurality of data entities based on the query and the extracted table;

generating at least one chart creating sequence corresponding to the table based on the query and the table summary, wherein the chart creating sequence comprises a series of actions for creating a chart that are represented by corresponding tokens, wherein the series of actions are determined iteratively using a decoder that calculates action values for a valid action space and heuristic beam searching based on the query representation and table representation;

determining a logic operation to apply on the plurality of data entities to derive a result corresponding to the query;

translating the logic operation into a formula executable on the data in the table;

creating at least one chart based on the at least one chart creating sequence by applying the formula to the data in the table; and outputting the at least one chart for display on the search results page as part of the search result, wherein the at least one chart provides a visual representation of the data in the table that corresponds to a user's query intentions and enables the user to evaluate relevant of the associated web document to the query.

2. The method of claim 1, further comprising:

determining whether the table is relevant to the query, and wherein the generating at least one chart comprises:

in response to determining that the table is relevant to the query, generating the at least one chart based on the query and the table.

3. The method of claim 1, wherein the generating at least one chart comprises:

generating at least one chart creating sequence corresponding to the table based on the query and the table; and creating the at least one chart based on the at least one chart creating sequence.

4. The method of claim 3, further comprising:

determining whether an action value corresponding to the at least one chart creating sequence is higher than a predetermined threshold, and wherein the creating the at least one chart comprises:

in response to determining that the action value is higher than the predetermined threshold, creating the at least one chart based on the at least one chart creating sequence.

5. The method of claim 3, wherein the generating at least one chart creating sequence comprises:

generating a query representation of the query;

generating a table representation of the table; and generating the at least one chart creating sequence based on the query representation and the table representation.

6. The method of claim 5, further comprising:

determining whether the table is relevant to the query based on the query representation and the table representation, and wherein the generating the at least one chart creating sequence comprises:

in response to determining that the table is relevant to the query, generating the at least one chart creating sequence based on the query representation and the table representation.

7. The method of claim 5, wherein the generating a table representation comprises:

generating the table representation based on a header set, a categorical feature set, and a data feature set of the table.

8. The method of claim 3, wherein the generating at least one chart creating sequence comprises:

generating a table representation of the table based on the query and the table; and generating the at least one chart creating sequence based on the table representation.

9. The method of claim 8, further comprising:

determining whether the table is relevant to the query based on the table representation, and wherein the generating the at least one chart creating sequence comprises:

in response to determining that the table is relevant to the query, generating the at least one chart creating sequence based on the table representation.

10. The method of claim 8, wherein the generating a table representation comprises:

generating the table representation based on the query, and a header set, a categorical feature set, and a data feature set of the table.

11. The method of claim 10, further comprising:

determining a categorical feature of each field of multiple fields of the table, to obtain multiple categorical features respectively corresponding to the multiple fields; and combining the multiple categorical features into the categorical feature set.

12. The method of claim 11, wherein the determining a categorical feature of each field comprises:

determining the categorical feature through predefined rules based at least on information of cells in the field.

13. The method of claim 8, wherein the generating a table representation comprises:

generating the table representation based on the query, and a header set, a body row set, and a data feature set of the table.

14. An apparatus for query-based table visualization, comprising:

at least one processor; and a memory storing computer-executable instructions that, when executed, cause the at least one processor to:

obtain a query submitted to a search engine, obtain at least one search result for the query from the search engine, wherein the search result is dynamically generated by the search engine in response to the query and is presented on a search results page, retrieve a web document associated with the at least one search result presented on the search results page and extract a table from the retrieved web document using table extraction techniques, generate a table summary including a plurality of data entities based on the query and the extracted table;

generate at least one chart creating sequence corresponding to the table based on the query and the table summary, wherein the chart creating sequence comprises a series of actions for creating a chart that are represented by corresponding tokens, wherein the series of actions are determined iteratively using a decoder that calculates action values for a valid action space and heuristic beam searching based on the query representation and table representation;

determine a logic operation to apply on the plurality of data entities to derive a result corresponding to the query;

translate the logic operation into a formula executable on the data in the table;

create, by the processor, at least one chart based on the at least one chart creating sequence by applying the formula to the data in the table; and output the at least one chart for display on the search results page as part of the search result, wherein the at least one chart provides a visual representation of the data in the table that corresponds to a user's query intentions and enables the user to evaluate relevant of the associated web document to the query.

15. A non-transitory computer readable storage medium storing instructions thereon, which, when executed by one or more processors, cause the one or more processors to perform operations comprising:

obtaining a query submitted to a search engine;

obtaining at least one search result for the query from the search engine, wherein the search result is dynamically generated by the search engine in response to the query and is presented on a search results page;

retrieving a web document associated with the at least one search result presented on the search results page and extracting a table from the retrieved web document using table extraction techniques;

generating a table summary including a plurality of data entities based on the query and the extracted table;

generating at least one chart creating sequence corresponding to the table based on the query and the table summary, wherein the chart creating sequence comprises a series of actions for creating a chart that are represented by corresponding tokens, wherein the series of actions are determined iteratively using a decoder that calculates action values for a valid action space and heuristic beam searching based on the query representation and table representation;

determining a logic operation to apply on the plurality of data entities to derive a result corresponding to the query;

translating the logic operation into a formula executable on the data in the table;

creating at least one chart based on the at least one chart creating sequence by applying the formula to the data in the table; and outputting the at least one chart for display on the search results page as part of the search result, wherein the at least one chart provides a visual representation of the data in the table that corresponds to a user's query intentions and enables the user to evaluate relevant of the associated web document to the query.

* * * * *